June 5, 1956

J. C. CHRISTENSEN ET AL 2,749,250

PROCESS OF COATING A METALLIC STRUCTURAL ARTICLE AND A
MARINE ORGANISM RESISTANT COMPOSITION THEREFOR

Filed April 5, 1954

INVENTOR.
William F. Fair, Jr.
John C. Christensen
BY
Walter J. Monacelli
ATTORNEY INVENTOR.
William F. Fair, Jr.
John C. Christensen
BY Walter J. Moracelli
ATTORNEY.

United States Patent Office 2,749,250
Patented June 5, 1956

2,749,250

PROCESS OF COATING A METALLIC STRUCTURAL ARTICLE AND A MARINE ORGANISM RESISTANT COMPOSITION THEREFOR

John Christian Christensen, Westfield, and William F. Fair, Jr., Cranford, N. J., assignors to Koppers Company, Inc., a corporation of Delaware Application April 5, 1954, Serial No. 420,872

12 Claims. (Cl. 117—26)

This invention relates in general to compositions of matter and a process for preparation thereof. More specifically it is directed to coating compositions which will not be substantially affected by pestiferous marine organisms when permanently immersed in or in contact with water, particularly salt water and brackish water, especially for surfaces which cannot be easily removed for periodic application of toxic anti-fouling paints. Additionally the instant invention is directed to coating compositions capable of withstanding both normal and excessive cathodic protective voltages and to coating compositions capable of protecting surfaces against corrosion. Additionally this invention relates to articles such as, for example, pipes, piling, rods, beams, and similar articles coated with these compositions, and to a process for coating these articles.

Numerous bituminous coating compositions are presently in use which are formulated solely for protecting pipes, piling, rods, beams, and like structural articles above ground. Other bituminous coating compositions, particularly the hot applied coatings, are specifically intended for protecting these pipes and like metallic articles when buried in the earth and are ideally suited for this purpose, particularly the coal-tar enamels. However, these coating compositions have not proved to be entirely satisfactory when these articles have been permanently immersed in sea water and are constantly subjected to the attack of marine organisms such as, for example, barnacles, teredos and similar pestiferous creatures. Asphalt enamels have been relatively quickly penetrated by barnacles and teredos enabling sea water to enter the puncture and cause corrosion of the metal surfaces of these articles. Even coal tar enamels are penetrated by barnacles and teredos although more slowly than are the asphaltic enamels.

The performances of bituminous coating compositions, both of the asphalt and of the coal-tar variety has not been entirely satisfactory when these coatings have been subjected to unrestricted cathodic protective currents. Occasionally, when installing coated beams, rods, pipe, etc., or driving coated piling, portions of the coating on these structural articles are scraped off. When this occurs, it is possible for current to start flowing from one exposed portion which is the anode, through the sea water or soil electrolytes to another exposed portion of the pipe, piling, beams, etc., which is the cathode. The current will return to the anodic portion through the wall of the pipe, piling, beam, etc.

When such a current flows, metal is removed from this bare anodic portion of the pipe leaving holes or "pits" in the surface of the pipe. In recent years cathodic protection systems have been developed to prevent this corrosion wherein the harmful current flow is stopped or neutralized by the application of a stronger current through the wall of the pipe, piling, etc., in the opposite direction. This opposing or neutralizing electrical current is generally provided by passing current from either surface power lines through a rectifier-sacrificial ground bed installation, or by the installation of sacrificial metallic electrodes composed usually of either magnesium, aluminum or zinc. These cathodic protection units are hung at calculated intervals underwater along the pipe line, pile or beam, etc.

Heretofore cathodic protection engineers recommended initial application of voltages far in excess of those necessary to protect bare metal so as to build up protective calcareous deposits on the bare spots from salts in the sea water. Investigation revealed that many coatings were literally "blasted" off the metal surface by formation of hydrogen blisters when such excessive currents were applied. A voltage of 800 millivolts (this negative potential is measured against a reference saturated calomel half-cell immersed in sea water) will keep bare steel from corroding in sea water. Some of the conventional marine paint compositions cannot withstand even this protective voltage. Certain cold applied coal-tar coatings stand up fairly well under the lower protective voltages but are loosened or disbonded by high potentials. Certain hot applied coal-tar enamels will withstand voltages as high as 1.0 volts but harmful effects such as disbonding and blistering become apparent at about 1.1 to 1.2 volts. Asphalt enamels will loosen and disbond readily from the metallic surfaces after being subjected to 1.0 volt negative to a saturated calomel half-cell in sea water.

It is therefore an object of the present invention to provide an anti-corrosive coating composition which will not be substantially affected by the attack of marine organisms such as, for example, barnacles, teredos, and similar pestiferous creatures, when immersed in water, particularly salt water and brackish water.

Another object is to provide an anti-corrosive marine organism-resistant coating composition which will withstand intentionally or accidentally applied excessive cathodic protective voltages when the coated pipes, piling, rods, beams or similar articles are under cathodic protection.

Another object is to provide a marine organism resistant coating composition which is highly effective in protecting pipes, piling, rods and similar articles.

An additional object is to provide, as articles of manufacture, structural articles such as pipes, piling, beams, rods and similar articles which have been coated with the anti-corrosive, marine organism-resistant coating composition of the instant invention.

A further object is to provide coated structural articles such as, for example, pipes or pipe lines coated with the compositions of this invention which possess a desired "negative buoyancy" when laid on the bottom of lakes, rivers and other bodies of water.

Still another object of this invention is to provide a process of coating structural articles such as pipes, beams, rods, etc., which will result in their being rendered substantially resistant to the attack of marine organisms and to corrosion and rusting.

Ancillary and additional objects and advantages will be apparent as the invention is hereinafter described in more detail.

It has now been found that the aforesaid objects are accomplished by coating compositions comprising an admixture of a major amount of inert, coarse, solid, discrete, water-insoluble, hard particles and a minor amount of a coal-tar enamel. The coal-tar enamel comprises an admixture of a coal digestion pitch and a filler, such as, for example, talc.

The term "coal digestion pitch," as employed herein, is applied to modified pitches obtained by digesting powdered bituminous coal in ordinary pitch and tar heavy oil. These modified pitches are also referred to as plasticized pitches. This mixture is fluxed with additional tar heavy oil if required to give the desired softening point and penetration properties.

The term "plasticized coal-tar enamel," as used herein, designates a coal-tar enamel containing a coal digestion pitch or plasticized pitch as its pitch ingredient. "Unplasticized coal tar enamel," as employed herein, designates a coal-tar enamel containing ordinary coal-tar pitch as its pitch ingredient and not a coal digestion pitch or plasticized pitch, so that the term "unplasticized," used herein, merely differentiates an ordinary or conventional coal-tar enamel from a plasticized coal-tar enamel containing a coal digestion pitch.

The term "tar heavy oil," as used herein, designates a tar fraction having not more than 1% distillate at 300° C. and a 25% maximum distillate at 355° C. It has a minimum specific gravity of 1.140 and contains not more than 0.5% water. This oil is not limited to being derived from a tar of any one particular source and can be obtained, for example, from coal tar, heavy water gas tar, light water gas tar, etc.

The term "pitch," as employed herein, is understood in the tar industry to designate a residue of tar distillation having a consistency ranging from that of heavy tar to that of hard pitch or semi-coke. Pitch may have softening points of about 100° to 300° F. (Softening points referred to in the specification and appended claims are determined by the A. S. T. M. standard ring and ball method D36–26 unless otherwise specified and penetration values referred to herein are determined by A. S. T. M. method D5–52.)

The terms, "primed," "priming," etc., are employed to designate the cold application of an adhesive bituminous composition, preferably to clean metal surfaces, so as to insure an effective bond between subsequent hot applied coal-tar coating compositions of the instant invention and the primed pipes, piling, rods, beams, etc.

The term "structural article" will be used herein to designate pipes, pipe lines, piling, rods, beams, ship bottoms, etc.

"Parts" and "percentages" herein are given by weight unless indicated otherwise.

In the preparation of coal digestion pitch or plasticized pitch, powdered bituminous coal is digested with pitch and tar heavy oil at a temperature range of from 270° C. to 350° C. and advantageously at approximately 315° C. until a homogeneous dispersion of the coal in the pitch medium is obtained. With this temperature range a suitable dispersion is obtained within a reasonable time. This dispersion is then fluxed with additional tar heavy oil, if required, to produce the desired softening point and penetration characteristics. The amount of coal used can ordinarily vary from about 15 to about 30 parts by weight; the amount of tar heavy oil utilized can range from about 30 to about 55 parts by weight, and the pitch can range from approximately 20 to approximately 45 parts by weight, the exact amounts of these materials utilized being dependent, of course, on their respective properties and the properties of the product desired.

Examples of typical coal digestion pitch compositions which may be utilized in the coating compositions of the instant invention are those prepared as follows:

34 parts of coal-tar pitch (softening point 158° F.), 25 parts of powdered bituminous coal, and 41 parts of coal-tar heavy oil are charged to a still or a digestion tank equipped advantageously with a mechanical agitating device to prevent local overheating and provided with heating means. These ingredients are then heated together, advantageously with agitation or stirring, at a temperature of about 315° C. for between two and four hours. At the end of this period, the heating is discontinued. The product is cooled for a brief period of time, discharged from the still, and is then ready for use. The product has a softening point of 208° F. and a penetration at 77° F. of 15 decimillimeters.

Another coal digestion pitch composition which may be utilized in the present novel protective coating composition is prepared by repeating the foregoing procedure using 39 parts of heavy water gas pitch (softening point 140° F.), 21 parts of powdered bituminous coal, and 40 parts of coke oven tar heavy oil. The product has a softening point of 228° F. and a penetration at 32° F. of 12 decimillimeters.

Still another pitch composition which may be employed in our novel composition is prepared by repeating the foregoing initial procedure utilizing 40 parts of coal tar pitch having a softening point of 130° F., 25 parts of powdered bituminous coal, and 35 parts of coal tar heavy oil. The resulting product has a softening point of 215° F. and a penetration of 11 decimillimeters at 77° F.

In practicing the invention, about 25 to 35 parts by weight, advantageously about 30 parts, of plasticized coal-tar enamel of the types hereinafter described is liquefied by heating to a temperature of about 490°–580° F. and advantageously to a temperature of about 520° F. About 65 to about 75 parts by weight, advantageously about 70 parts, of inert, coarse, solid, discrete, water-insoluble, hard particles such as blasting-sand particles are then incorporated into the liquified coal-tar enamel. This blasting-sand is thoroughly mixed with the liquified plasticized coal tar enamel until a homogeneous admixture is obtained. Any conventional mixer or agitator known to this art such as, for example, a sigma blade mixer may be employed for carrying out the mixing.

Other inert, coarse, solid, discrete, water-insoluble, hard particles can be utilized in place of the blasting-sand particles such as, for example, the particles or granules which are embedded or partially embedded in the coating compositions of roofing-shingles and which are known in the roofing industry as and which shall be referred to herein as "roofing-shingle granules." Roofing-shingle granules, which are granules or particles of slag, gravel, slate or equivalent materials, are utilized in the coating composition in approximately the same proportion by weight as the blasting-sand particles. When blasting-sand particles are employed in the composition, they are preferably of a size ranging from about 1/64 of an inch to about 1/16 of an inch in diameter and are graded to pass an 8-mesh sieve and to be retained on a 50-mesh sieve. These sharp blasting sand particles have a specific gravity of from about 2.59 to about 2.66. Slag particles or granules have a specific gravity of from about 0.8 to 1.9. It is to be understood that any inert, coarse, solid, discrete, water-insoluble, hard particles or granules can be utilized in this invention as long as these granules have a Moh's test hardness value ranging from 5 to 10. Materials falling within this hardness value range would include, for example, apatite, feldspar, quartz, topaz, sapphire and diamond. Obviously such materials as diamonds and sapphires would be undesirable due to the high cost of these materials, but nevertheless are included within the concept of this invention as they would provide an impenetrable barrier to barnacles, teredos, etc. It is to be emphasized that a Moh's test hardness value ranging from 5 to 10 is critical to the operability of the instant invention as it has been found that barnacles and teredos will penetrate softer materials in a relatively short time.

Moh's test for determining the hardness of the foregoing materials is described in the Handbook of Engineering Fundamentals by Ovid W. Eshbach in the chapter entitled "Mechanics of Materials" (pages 5–90). In conducting this test, a smooth surface of the mineral to be tested is selected on which a point of the standard is pressed and moved back and forth several times 1/8 of an inch or less. If the mineral is scratched, it is softer than standard. Two minerals of equal hardness will scratch each other. Pulverulent or splintery materials are "broken down" by the test and yield an "apparent"

hardness often much lower than the true hardness. By virtue of this test, Moh has set up a scale of hardness. In this scale, talc, for example has a hardness value of 1; apatite, a hardness value of 5; feldspar, a hardness value of 6; quartz, a hardness value of 7; topaz, a hardness value of 8; sapphire, a hardness value of 9; and diamonds, a hardness value of 10. Moh also has devised a test for the softer minerals wherein a mineral which may be scratched by a finger nail has a hardness up to 2.5; minerals scratched by a copper coin have a hardness up to 3; and by a knife blade, up to a hardness of 5.5.

The following examples are provided to illustrate some preferred compositions of the instant invention but are not to be construed as limitations thereon.

EXAMPLE I

|  | Percent |
|---|---|
| Plasticized coal tar enamel | 30 |
| Blasting-sand | 70 |

EXAMPLE II

|  |  |
|---|---|
| Plasticized coal tar enamel | 25 |
| Roofing-shingle granules | 75 |

EXAMPLE III

|  |  |
|---|---|
| Plasticized coal tar enamel | 33 |
| Blasting-sand | 67 |

EXAMPLE IV

|  |  |
|---|---|
| Plasticized coal tar enamel | 28 |
| Roofing-shingle granules | 72 |

EXAMPLE V

|  |  |
|---|---|
| Plasticized coal tar enamel | 34 |
| Roofing-shingle granules | 66 |

EXAMPLE VI

|  |  |
|---|---|
| Plasticized coal tar enamel | 26 |
| Blasting-sand | 74 |

A plasticized coal-tar enamel which is eminently adapted for utilization in the foregoing novel coating compositions is one containing about 70% by weight of coal digestion pitch and about 30% by weight of talc. This plasticized coal-tar enamel conforms to American Water Works Association specifications which requires the following characteristics:

| Softening point (R and B) | 220° F.–235° F. |
|---|---|
| Penetration at 77° F | 10–20. |
| Penetration at 115° F | 15–55. |
| Ash by weight (by ignition) | 25–35%. |
| Specific gravity, 25/25° C. (A. S. T. M. Method D–71–52) | 1.40–1.60. |

Other plasticized coal-tar enamels can be utilized in place of the foregoing plasticized enamel in the novel coating compositions of this invention. For example, plasticized coal-tar enamels containing from about 65 to about 80% by weight of coal digestion pitch and from about 20 to about 35% by weight of a filler such as talc may be utilized if desired. Such enamels are prepared by heating a suitable coal digestion pitch until it assumes a liquid state and thereafter admixing a filler such as talc of substantially 200 mesh fineness therein until the admixture of coal digestion pitch and talc becomes homogeneous throughout.

Figure 1:
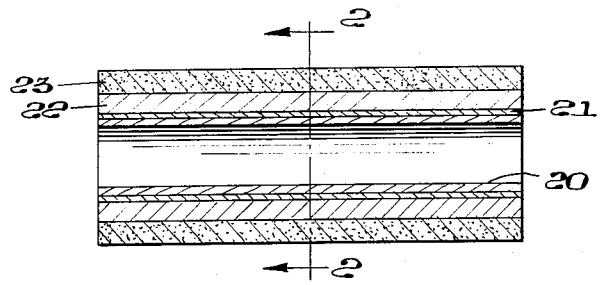
Figure 1 is a longitudinal sectional view through a preferred composite coated pipe of the instant invention.
Figure 2:
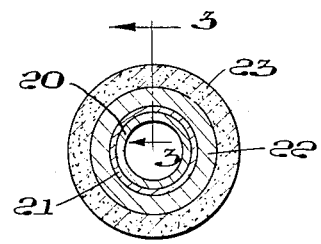
Figure 2 represents a transverse sectional view taken substantially on line 2—2 of Figure 1.
Figure 3:
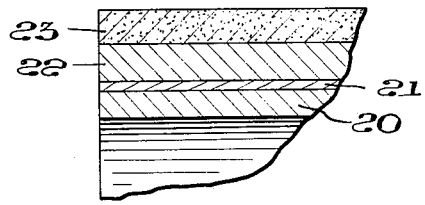
Figure 3 is an enlarged sectional detail view taken substantially on line 3—3 of Figure 2.
Figure 4:
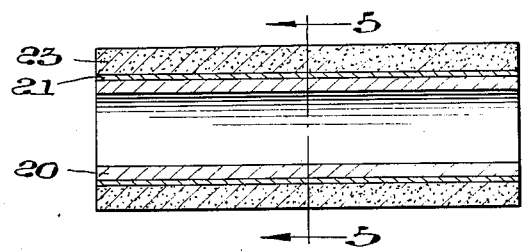
Figure 4 is a longitudinal sectional view illustrating a modified form of the coated pipe.
Figure 5:
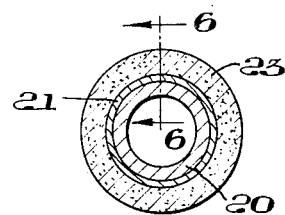
Figure 5 is a transverse sectional view taken on line 5—5 of Figure 4.
Figure 6:
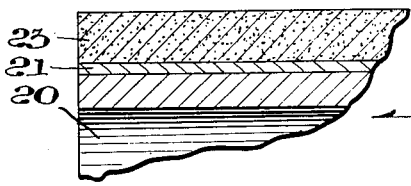
Figure 6 represents an enlarged sectional detail view taken substantially on line 6—6 of Figure 5.
Figure 7:
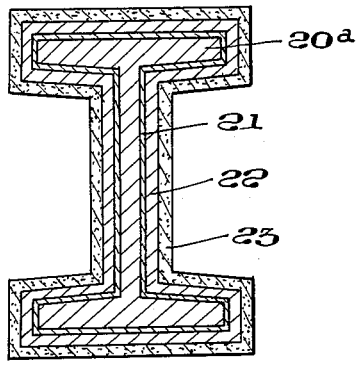
Figure 7 is a transverse sectional view through a preferred composite coated I-beam of the instant invention.
Figure 8:
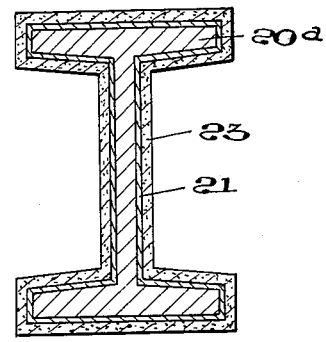
Figure 8 is a transverse sectional view illustrating a modified form of the coated I-beam.
Figure 9:
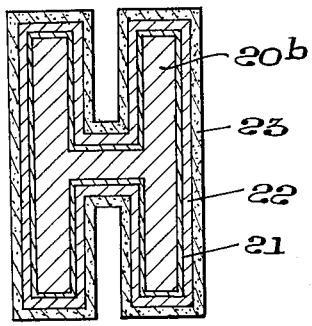
Figure 9 represents a transverse sectional view through a preferred composite coated H-beam of the instant invention.
Figure 10:
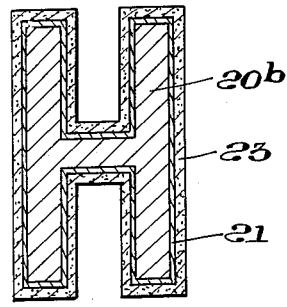
Figure 10 represents a transverse sectional view illustrating a modified form of the coated H-beam.

As shown in Figures 1 and 2 and in more detail in Figure 3, a structural article such as a ferrous metal pipe 20, or, as shown in Figure 7, a metal I-beam 20a, or as illustrated by Figure 9, a metal H-beam 20b is advantageously primed with a primer coat 21 of a bituminous priming solution which is hereinafter described. Covering this primer coat 21 is a first protective coating 22 of the hereinbefore described plasticized coal-tar enamel. Coatings of plasticized enamels are particularly desirable when the structural article is a pile or similar marine structure inasmuch as these enamels resist pile driving shocks much better than other less plasticized or unplasticized bituminous coating compositions. However for pipeline work where the coated pipe is to be laid in a trench or under water rather than driven as is the case with piling, a more advantageous coating composition which may be utilized, if desired, as the first protective coating 22 is one of the class of unplasticized enamels containing from about 65 to about 80 parts by weight of coal tar pitch and and from about 20 to 35 parts by weight of a filler such as, for example, talc. Examples of unplasticized coal-tar enamels which are eminently adapted for this first protective coating, where the pipe is to be laid in a trench or under water without being subjected to shock, are:

EXAMPLE VII

*Unplasticized coal-tar enamel A*

|  | Percent |
|---|---|
| Coal-tar pitch | 65 |
| Talc | 35 |

EXAMPLE VIII

*Unplasticized coal-tar enamel B*

|  |  |
|---|---|
| Coal-tar pitch | 79 |
| Talc | 21 |

EXAMPLE IX

*Unplasticized coal-tar enamel C*

|  |  |
|---|---|
| Coal-tar pitch | 75 |
| Talc | 25 |

EXAMPLE X

*Unplasticized coal-tar enamel D*

|  |  |
|---|---|
| Coal-tar pitch | 68 |
| Talc | 32 |

The foregoing coal-tar enamels have properties which are represented by the following range of values:

| Softening point | 180° to 205° F. |
|---|---|
| Penetration at 77° F | 0 to 3. |
| Penetration at 115° F | 1 to 10. |
| Ash by weight (by ignition) | 20 to 39. |
| Specific gravity, 25/25° C. (A. S. T. M. Method D71–52) | 1.40 to 1.65. |

They are prepared by melting coal-tar pitch having softening points ranging from approximately 100° F. to 200° F. and thereafter admixing the indicated proportions of filler until a homogeneous mixture is produced. Any conventional mixer known to this art may be utilized for carrying out the mixing operation. Covering the first protective coating 22 is a second protective coating 23 of our novel coating composition which is hereinbefore described in Examples I, II, III, IV, V and VI; or, if this structural article is a pipe or pipeline which is not to be subjected to substantial shock such as, for example, driving shock, the second protective coating 23 is substantially identical with the composition set forth in Examples I–VI except that one of the unplasticized coal tar enamels A, B, C or D can be substituted for the plasticized enamel in the identical proportion as the plasticized enamel. If an unplasticized enamel is employed in the second protective coating 23, the first protective coating 22 is advantageously one of the unplasticized coal tar enamels A, B, C or D.

With reference now to Figures 4, 5, 6, 8 and 10 which illustrate a slight modification of the article of manufacture of the instant invention, the pipe 20 (Figures 4, 5 and 6), I-beam 20a (Figure 8) or H-beam 20b (Figure 10) can, if it is so desired, advantageously be primed with the primer coat 21 and thereafter coated with the protective coating 23 of the novel coating composition.

Prior to the application of the coating materials to the ferrous metal pipe 20, I-beam 20a or H-beam 20b, illustrated in Figures 1, 2, 3, 7 and 9, the surface thereof is advantageously thoroughly cleaned to remove foreign material such as oil, grease, rust, mill scale, welding scale, dirt, dust, etc. This cleaning is advantageously accomplished by means of sand blasting but may also be carried out with suitable wire brushes; by treating the surfaces of these articles with a pickling solution such as, for example, sulfuric or nitric acid; applying steam to the surfaces thereof; subjecting the surfaces of these articles to the action of manually or mechanically operated knives, scrapers, etc., or by flame cleaning. The cleaned structural article is advantageously primed immediately after cleaning by the application of a bituminous primer coating 21 thereto. If the cleaned structural article is primed, the bituminous priming solution can be applied cold by brushing or spraying. On new ferrous metal or steel, this priming solution is advantageously applied in a uniformly thin film at the rate of approximately 500–700 square feet per gallon. On a roughened or slightly pitted surface, the coverage may drop to 300–500 square feet per gallon.

A typical priming solution suitable for the practice of the instant invention is one containing about 57.5 parts of a coal digestion pitch having a softening point of approximately 205–215° F. and about 42.5 parts of a coal tar solvent naphtha having not more than 5% distillate at 150° C. and not less than 90% distillate at 200° C. These constituents are thoroughly admixed for several minutes at an initial pitch temperature of between about 310° F. and 325° F., allowing the temperature to drop while agitating.

Other priming solutions composed of from about 30 to about 45 parts of refined coal tar solvent naphtha of the 150–200° C. boiling range and from about 55 to 65 parts of an unplasticized coal tar pitch having a softening point of from 100° F. to 200° F. can be utilized in place of the foregoing priming solution for unplasticized coal tar enamels containing coal tar pitch as the pitch ingredient and not coal digestion pitch or plasticized pitch. The pitch base of each primer is selected so as to produce the best adhesion with its companion enamel.

Other solvents can be utilized in whole or in part in place of the coal-tar solvent naphtha. For example, fractions of heavy water-gas tar distillates and of light water-gas tar distillates, and petroleum distillates containing a preponderance of aromatics can be utilized. The boiling points of these solvents may vary from about 150° C. to about 200° C. Additionally the solvents of the abovementioned boiling range may be replaced in whole or in part, if desired, by lower boiling, compatible coal-tar solvents, such as solvents boiling between 80° C. and 150° C., when quicker-drying, bituminous coating compositions are specified.

The primer coat 21 will dry in from 12 to 24 hours, depending upon the atmospheric conditions. When the weather is hot and dry, the evaporation of the solvent is accelerated. When the weather is cool and damp, a considerably longer drying period is required. For best results, the temperature of the pipe should be over 35° F. Under these conditions, the primer coat will dry in not more than 24 hours.

The primed structural article is then substantially ready for the coating operations. However, just before the additional coatings are applied, the primed structural article is advantageously freed of all dust, dirt, mud and other foreign material. The use of feather dusters, clean, lint-free rags, and whisk brushes will effectively accomplish this operation.

The coal-tar enamel, which is to be applied to the primed structural article as the first protective coating 22, is then liquified by means of heat. If the particular coal-tar enamel to be used for the first protective coating is of the composition of the hereinbefore-described plasticized coal-tar enamel, which is characterized by containing coal digestion pitch or plasticized pitch as the pitch ingredient, the enamel is heated to a temperature in the range of from approximately 450° to approximately 490° F. and is applied at such temperature to the primed structural article. However, if the composition of the coal-tar enamel to be applied as the first protective coating 22 is that of one of the hereinbefore-described unplasticized coal-tar enamels A, B, C or D, which are characterized by containing unplasticized coal-tar pitch and not coal digestion pitch as the pitch ingredient, the enamel should be heated to a temperature in the range of approximately 375°–490° F. Variations of temperature within the indicated range will be dependent upon the temperature of the air and the pipe. During cold weather, the metal surface may be heated by flame cleaning before priming and the enamel is advantageously heated to a temperature near the upper limit. Thereafter the enamel is applied to the primed pipe by non-atomized pressure spraying, dipping, brushing, pouring, ragging or by the use of any suitable coating machine known to this art. This first protective coating 22 of coal tar enamel is applied in a thickness of from about 1/32" to about 3/32" or more, if desired, advantageously in a thickness of approximately 1/16". This is true regardless of whether the first protective coating is the hereinbefore-described plasticized coal tar enamel or one of the hereinbefore-described unplasticized coal tar enamels A, B, C or D. The enamel is permitted to cool and harden and the pipe is then ready for the application of the second protective coating 23. One of the novel-coating compositions hereinbefore-described in Examples I, II, III, IV and VI is prepared and kept liquid by heating to a temperature of from about 490°–580° F. and agitated or mixed for a brief period to insure a homogeneous mixture. This second coating 23 is then advantageously applied at a temperature within the range specified by troweling, pouring, dipping or by the utilization of any suitable coating apparatus known in the tar industry, at a thickness of from about 1/4" to about 3/8" and advantageously at about 5/16", although this second coating can be applied in a thickness substantially greater than 3/8", if desired. The coating is then allowed to cool and harden.

Structural articles coated in the foregoing manner utilizing a plasticized, coal-tar enamel for the first protective coating are particularly desirable and preferred when the articles are to be driven such as piling. It has been found that this combination of primer, plasticized coal-tar enamel first protective coating, and plasticized, coal-tar enamel-blasting-sand second protective coating is substantially resistant to pile-driving shocks and similar shocks and jars.

With reference to Figures 4, 5, 6, 8 and 10, it is to be noted that the structural articles illustrated do not possess the first protective coating 22 which the structural article illustrated by Figures 1, 2, 3, 7 and 9 possess. In coating these structural articles, the coating operation described with respect to the application of the first protective coating 22 is simply omitted and the application of the marine organism-resistant coating is carried out on the advantageously cleaned and primed structural article in the manner hereinbefore described.

As another embodiment of the instant invention, the piling, I-beam, H-beam or other structural article is advantageously cleaned and preferably primed and thereafter coated with the first protective coating of plasticized coal-tar enamel in the manner hereinbefore described with regard to the structural articles shown in Figures 1, 2, 3, 7 and 9. Advantageously while this first protective coating is still warm enough to be tacky and adhesive, a stratum or layer of inert, coarse, solid, discrete, water-insoluble, hard particles such as, for example, sharp blasting-sand particles or roofing-shingle granules are applied to the coated structural article in any suitable manner in a thickness of advantageously about $\frac{1}{16}''$ to about $\frac{1}{8}''$ and desirably at about $\frac{3}{32}''$, advantageously while the structural article is in a substantially horizontal position. A thicker layer of particles can be applied if desired. An external protective coating of heat-liquified, coal-tar enamel is then applied over the layer of particles at approximately the same thickness as the first protective coating, viz., at a thickness of from about $\frac{1}{32}''$ to about $\frac{3}{32}''$, or more, and advantageously about $\frac{1}{16}''$. If this enamel of the external protective coating is the hereinbefore-described plasticized coal-tar enamel, it is heated at a temperature range of from approximately 450–490° F. and applied at a temperature within this range. However, if the enamel is one of the hereinbefore-described unplasticized coal-tar enamels A, B, C or D, which is utilized when the coated structural article such as, for example, a pipe or pipeline is not to be subjected to driving shock and which can be removed from atmospheric conditions, particularly atmospheric conditions prevalent during hot weather, it is heated and applied at a range of from approximately 375–490° F. by non-atomized pressure spraying, brushing, pouring, etc. The coating is then permitted to cool and harden. The first protective coating, when the external coating is an unplasticized coal-tar enamel, is advantageously also an unplasticized enamel. The foregoing method produces a desired result in that the external coating of plasticized or unplasticized coal-tar enamel floods through and penetrates the stratum or layer of inert, coarse, solid, discrete, water-insoluble, hard particles bonding them firmly to the initially-applied first protective coating, resulting in an exterior coating of coal-tar enamel filled with these particles or granules, which is substantially the same as the external coating of the hereinbefore-described novel coal-tar enamel-particle or granule composition which is applied hot over the first protective coating of coal-tar enamel as is described with regards to the coated structural articles illustrated by Figures 1, 2, 3, 7 and 9. This method of coating is often more convenient to use than the hereinbefore-described method of applying the novel admixture of the coal-tar enamel and granules or particles. Structural articles coated in accordance with this method are protected from barnacle and teredo attack by penetration and are also resistant to accidentally or intentionally applied excessive cathodic protective voltages. Any of the previously-described inert, coarse, solid, discrete, water-insoluble, hard particles or granules having a Moh's test hardness value of from 5 to 10 can be utilized with excellent results in the foregoing method.

The term "hard" as applied to the granules or particles utilized in this invention is used herein to designate granules or particles having a Moh's test hardness value ranging from 5 to 10, granules or particles of a relatively high compression strength, and granules or particles that are not easily cut or separated into parts and are not easily penetrated.

While all of the coated structural articles disclosed in Figures 1–10 are advantageously coated with a primer coat 21, it is to be understood that this primer coat can be omitted, if desired. For example, in a "hot dip" where the metallic structural article is immersed in the heated coating composition or other medium for a sufficient length of time to permit the metal to approach the temperature of the hot coating to be applied, the primer coat would not be necessary.

It is to be noted that other fillers can be employed in the coating composition of this invention in place of the talc. For example, slate dust or flour, ground mica, clay, shale, etc., may be utilized. The fillers should be powdered sufficiently to pass substantially a 200-mesh sieve.

The terms "granules" and "particles" are used interchangeably throughout this specification. These particles or granules have a relatively high specific gravity which is highly advantageous when "negative buoyancy" is desired. Frequently, even when there is no barnacle problem as in fresh-water river crossings, it is necessary to coat or position concrete around the coated pipe or to use special ground clamps on the bottom of the river to prevent movement or floating, which might result in leaks in the pipeline. This problem is obviated by the utilization of these particles which have a relatively high specific gravity in the coating compositions of this invention and by the application of these suitable thick coatings.

Structural articles coated in the manner described herein have been found to be substantially resistant to barnacles, teredos and similar marine organisms even after 4 years' immersion in sea water. On the contrary, conventional coatings were penetrated by barnacles and teredos within 3 to 6 months, asphalt enamels within 1 year, and typical coal tar enamel coatings within 1 to 2 years. The novel plasticized enamel-blasting-sand composition coating was not affected in any discernible way by the cathodic protective currents even when the potential was maintained at approximately 1.4 volts which is the highest obtainable from magnetism anodes in sea water. This was found to be true even after the plasticized enamel-blasting-sand coating had been subjected to this high cathodic protective potential in sea water for over 2½ years. The annual cost of operating the cathodic protective system can be kept to a minimum by coating the structural articles with the coatings and in the manner described herein, because the cost of cathodic protection is directly proportional to the metal surface exposed, which will increase with years of service through penetration of coatings by marine organisms unless a system resistant to marine organisms and capable of withstanding cathodic protective potentials is used.

It is to be understood that the novel coating compositions of this invention are not toxic to marine organisms like the toxic anti-fouling marine paint compositions. On the contrary, the barnacles, teredos, oysters, etc., as well as marine vegetable growths and other organisms can readily attach themselves to the hard surfaces provided by the novel coating compositions but cannot penetrate or disrupt the coatings, and therefore no punctures can be made through the anti-corrosion barrier coat to the metal itself.

The invention claimed is:

1. A barnacle and teredo resistant composition which is also resistant to excessive cathodic protective voltages and to pile driving shock comprising a mixture of a major amount of inert, coarse, solid, discrete, water-insoluble, hard particles having a Moh's test hardness of from 5 to 10 and a minor amount of a plasticized coal-tar enamel containing from about 65 to about 80% by weight of coal digestion pitch and from about 20 to about 35% by weight of talc.

2. A composition according to claim 1 wherein the inert, coarse, solid, discrete, water-insoluble, hard particles are blasting-sand particles.

3. The composition of claim 1 wherein the inert, coarse, solid, discrete, water-insoluble, hard particles are roofing shingle granules.

4. A barnacle and teredo resistant composition which is also resistant to excessive cathodic protective voltages and to pile driving shock comprising a mixture of a major amount of inert, coarse, solid, discrete, water-insoluble, hard particles having a Moh's test hardness of from 5 to 10 and a minor amount of a plasticized coal-tar enamel comprising about 70% by weight of a coal digestion pitch and about 30% by weight of talc.

5. The composition according to claim 4 wherein the inert, coarse, solid, discrete, water-insoluble, hard particles are roofing-shinge granules.

6. The composition according to claim 4 wherein the inert, coarse, solid, discrete, water-insoluble, hard particles are blasting-sand particles.

7. A process of coating a metallic structural article comprising applying to a metallic structural article a primer coat of a bitmuminous priming composition containing from about 55 to about 65 parts by weight of coal-digestion pitch and from about 30 to about 45 parts by weight of aromatic low-boiling solvent boiling in the range of approximately 80°–200° C.; permitting said primer coat to dry; applying over said primer coat at a temperature ranging from approximately 450–490° F. a first coating of a plasticized coal-tar enamel containing from about 65 to about 80% by weight of coal digestion pitch prepared in the aforesaid manner and from about 20 to about 35% by weight of talc; permitting said first coating to cool; applying over said first coating a second coating at a temperature ranging from approximately 490°–580° F. of a composition of claim 4.

8. The process according to claim 7 wherein the inert, coarse, solid, discrete, water-insoluble, hard particles are blasting-sand particles.

9. The process as described in claim 7 wherein the inert, coarse, solid, discrete, water-insoluble, hard particles are roofing-shingle granules.

10. A process of coating a metallic structural article comprising applying a primer coat to a metallic structural article of a bituminous priming composition containing from about 55 to about 65 parts by weight of coal-digestion pitch and from about 30 to 45 parts by weight of aromatic low-boiling solvent boiling in the range of approximately 80–200° C., permitting said primer coat to dry; applying over said primer coat at a temperature ranging from approximately 450°–490° F. a first coating of a plasticized coal-tar enamel containing from about 65 to about 80% by weight of a coal-digestion pitch and from about 20 to about 35% by weight of talc; permitting said first coating to partially cool; applying a stratum of inert, coarse, solid, discrete, water-insoluble, hard particles having a Moh's test hardness of from 5 to 10 to the partially-cooled plasticized coal-tar enamel; and thereafter applying at a temperature ranging from approximately 450°–490° F. an external coating of plasticized coal-tar enamel containing from about 65 to about 80% by weight of coal-digestion pitch and from about 20 to about 35% by weight of talc over said stratum of particles.

11. The process according to claim 10 wherein the inert, coarse, solid, discrete, water-insoluble, hard particles are blasting sand particles.

12. The process as described in claim 10 wherein the inert, coarse, solid, discrete, water-insoluble, hard particles are roofing shingle particle.

References Cited in the file of this patent
UNITED STATES PATENTS

| Number | Name | Date |
|---|---|---|
| 732,663 | Stempel | June 30, 1903 |
| 1,024,549 | Becker | Apr. 30, 1912 |
| 1,034,712 | Jablesnik | Aug. 6, 1912 |
| 1,948,007 | Putnam | Feb. 20, 1934 |
| 2,045,906 | Gardner et al. | June 30, 1936 |
| 2,047,772 | Eckert | July 14, 1936 |
| 2,158,771 | Beckwith | May 16, 1939 |
| 2,395,041 | Fair | Feb. 19, 1946 |
| 2,469,908 | Wallace | May 10, 1949 |
| 2,472,100 | Fair | June 7, 1949 |
| 2,629,669 | Anderton | Feb. 24, 1953 |
| 2,656,857 | Cavallier | Oct. 27, 1953 |